(12) United States Patent
Wissner-Gross

(10) Patent No.: US 7,739,294 B2
(45) Date of Patent: Jun. 15, 2010

(54) METHOD FOR CREATING A TOPICAL READING LIST

(76) Inventor: Alexander David Wissner-Gross, 20 Prescott St., Apartment #45, Cambridge, MA (US) 02138

( * ) Notice: Subject to any disclaimer, the term of this patent is extended or adjusted under 35 U.S.C. 154(b) by 505 days.

(21) Appl. No.: 11/653,033

(22) Filed: Jan. 12, 2007

(65) Prior Publication Data

US 2007/0179946 A1 Aug. 2, 2007

Related U.S. Application Data

(60) Provisional application No. 60/758,512, filed on Jan. 12, 2006.

(51) Int. Cl.
*G06F 7/00* (2006.01)
*G06F 17/30* (2006.01)
(52) U.S. Cl. ............................. 707/765; 704/256
(58) Field of Classification Search .............. 707/1–10, 707/100–104.1, 200–206; 704/256, 256.1, 704/256.5
See application file for complete search history.

(56) References Cited

U.S. PATENT DOCUMENTS 6,961,954 B1 * 11/2005 Maybury et al. ............... 725/53
7,386,542 B2 * 6/2008 Maybury et al. ............... 707/3

OTHER PUBLICATIONS

Tie-Yan Liu et al., Webpage importance analysis using conditional Markov random walk, Sep. 19-22, 2005, IEEE, 515-521.*
Sepandar D. Kamvar et al., Extrapolation methods for accelerating PageRank computations, May 2003, ACM, 261-270.*

* cited by examiner

*Primary Examiner*—Jean B Fleurantin
(74) *Attorney, Agent, or Firm*—Mark S. Leonardo; Brown Rudnick LLP

(57) ABSTRACT

A method for creating an ordered reading list of predetermined length of relevant topics from a hyperlinked database source of information website for a user. The method includes determining at least one topic of interest based on a plurality of methods and choosing a topic ordering algorithm from a plurality of topic ordering algorithms. A top-down schematic algorithm includes a page rank calculation performed by iterating until a convergence. A bottom-up schematic algorithm includes a linear parameterization of a ratio of an order from a plurality of source topics to a plurality of sink topics of an article, and a horizontal schematic algorithm includes an order parameterization by absolute differences of a log of a plurality of ranks and an absolute difference of a plurality of distances with analogous cutoff methods. The method also includes calculating one of a plurality of topic ordering algorithms based on the topic of interest and a user, updating the hyperlinked database source of information, forming a reading list and ranking the list based on the topic ordering algorithm, and outputting the ranking and the list of reading materials to an interface depending on an outcome of the topic ordering algorithm.

24 Claims, 8 Drawing Sheets

| Order | $\beta = 0.01$ | $\beta = 0.1$ | $\beta = 1.0$ |
|---|---|---|---|
| 1 | Helicopter | Helicopter | Helicopter |
| 2 | 2000 | United States | 20$^{th}$ century |
| 3 | United States | 2000 | U.S. Navy |
| 4 | Race (U.S. Census) | U.S. Navy | Igor Sikorsky |
| 5 | Wikipedia | 20$^{th}$ century | Jan Bahyl |
| 6 | United Kingdom | Jan Bahyl | Kamov Ka-50 |
| 7 | Marriage | Igor Sikorsky | Robinson Helicopter |
| 8 | U.S. Census bureau | United Kingdom | United Kingdom |
| 9 | England | Kamov Ka-50 | United States |
| 10 | Asian (U.S. Census) | Wikipedia | Westland Aircraft |

FIG. 4

| Order | Merged PageRank | Distance ordering (Source:Drain) |
|---|---|---|
| 1 | Physics | Physics (0:2) |
| 2 | Greek language | Astronomy (1:2) |
| 3 | 20th century | 20th century (1:1) |
| 4 | United States | Greek language (1:1) |
| 5 | Italy | 1950s (2:1) |
| 6 | United Kingdom | United States (2:1) |
| 7 | 1950s | 15th century (2:1) |
| 8 | 1916 | 1961 (2:1) |
| 9 | China | 1946 (2:1) |
| 10 | Helicopter | Helicopter (3:0) |

FIG. 6

| Order | Merged PageRank | Distance ordering (Drain 1:Drain 2) |
|---|---|---|
| 1 | 19th century | Ecotourism (2:2) |
| 2 | X-ray | United States (2:2) |
| 3 | United Kingdom | New Zealand (2:2) |
| 4 | Latin | Australia (2:2) |
| 5 | 2003 | Biotechnology (1:0) |
| 6 | 2000 | Convention on Biological Diversity (2:1) |
| 7 | World War II | E. coli (2:1) |
| 8 | Germany | United Nations (2:1) |
| 9 | 2002 | DNA microarray (2:1) |
| 10 | Soviet Union | Genetic engineering (2:1) |
| 80 | Convention on Biological Diversity | Republic of Congo (3:2) |
| 81 | Radiation | Kenya (3:2) |
| 82 | Enterobacteriaceae | Seychelles (3:2) |
| 83 | Genetic engineering | Swaziland (3:2) |
| 84 | Salmonella typhi | Guinea-Bissau (3:2) |

FIG. 7

METHOD FOR CREATING A TOPICAL READING LIST

This application claims the benefit of U.S. Provisional Application No. 60/758,512, filed Jan. 12, 2006, and which is incorporated herein by reference.

BACKGROUND OF THE INVENTION

The present invention generally relates to a method for creating a reading list of information, and more particularly, a method for automatically creating, in real-time, a topical reading list with corresponding web-based links of relevant information according to a topic of interest.

Today, researching is generally conducted either using textbooks or using the World Wide Web. There are a variety of search techniques on the Internet that push different bits of information using various search engine queries. The Internet contains what appears to be infinite amounts of information. Locating information is not always easy, and usually, search engines return large quantities of irrelevant and useless information.

SUMMARY OF THE INVENTION

An embodiment of the present invention is a method for creating an organized list of information with relevant topics from a hyperlinked database source of information website. The method includes determining at least one topic of interest, searching for at least one related topic to the at least one topic of interest, calculating a relevancy factor for each of the at least one related topic, ranking each of the at least one related topic based on its the relevancy factor, producing the reading list based on the ranking of the at least one related topic, and outputting the ranking and the reading list to an interface.

Another embodiment of the present invention includes a method for creating an organized topical reading or content list from a hyperlinked database (e.g., hypertext) source of information website for a user. The method includes determining a topic of interest based on a plurality of methods and choosing a topic ordering algorithm from a plurality of topic ordering algorithms. These algorithms include at least one of a top-down schematic algorithm, a bottom-up schematic algorithm, and a horizontal schematic algorithm. The top-down schematic algorithm includes a page rank calculation performed by iteratively propagating node weights in the hypertext until a condition such as convergence of nodes explored has been met. The bottom-up schematic algorithm includes a combination function such as a linear parameterization of a ratio of an order from a plurality of source topics to a plurality of sink topics of an article, and the horizontal schematic algorithm includes a combination function such as an order parameterization by absolute differences of a log of a plurality of ranks and an absolute difference of a plurality of distances with analogous cutoff methods. The method also may include calculating one of a plurality of topic ordering algorithms based on the topic of interest and a user, updating a database of information, ranking the list of reading materials based on the topic ordering algorithm, and outputting the ranking and the list of content or reading materials to an interface depending on an outcome of the topic ordering algorithm.

BRIEF DESCRIPTION OF THE DRAWINGS

Various exemplary embodiments of the present invention will be described in detail, with reference to the following figures, wherein:

FIG. 4 is a table that depicts the influence of the personalization tuning parameter $\beta$, on top-down scenario ordering for "helicopter", for example, with d=0.1;

FIG. 6 is a table that depicts a comparison of methods for bottom-up ordering, for example, from "Physics" to "Helicopter", wherein the minimum path lengths are indicated for the distance ordering;

FIG. 7 is a table that depicts a comparison of methods for a horizontal ordering example at the interface of "Chemical Engineering" and "Biotechnology";

DETAILED DESCRIPTION OF AN ILLUSTRATIVE EMBODIMENT OF THE PRESENT INVENTION

The various exemplary embodiments of the present invention are directed to a virtual information system which produces a topical reading list of relevant information or content based on a topic of interest. Personalized reading preparation poses an often encountered important challenge for education and continuing education, amongst others. Using localized link voting and graph distance ordering, the present invention shows that a personalized background reading list may be generated automatically from a link structure of an online source of information. In some examples, and throughout the specification, the example of an online source of information or content may refer to the Wikipedia online encyclopedia and its link structure.

There are several situations in which the present invention would prove to be extremely useful. Firstly, consider a professional with a broad and general educational foundation who would like to be knowledgeable about a new client's industry. Rather than laboriously reading text books and publications to comprehensively patch in his/her knowledge gap, the professional's computer (for example) using an embodiment of the present invention, prepares personalized background reading on the industry. Now, the professional will have a series of links set up on his/her interface that he/she can simply read through without having to search on his/her own.

Another example involves an interdisciplinary researcher who uses software to prepare a course of study at a rapidly growing interface between fields, such as chemical engineering and biotechnology, for which few authoritative, yet up to date, texts exist. In this situation, the researcher can store both topics of interest, and the program of the present invention will produce topical reading lists for the researcher to review and learn. The list of topics of interest produced includes topics that are each relevant to all of the seed topics.

The present invention may be implemented by a user on a conventional or general-purpose computer system, such as a personal computer configured to be a member of the service of the present invention with a connection to the Internet.

Figure 1:
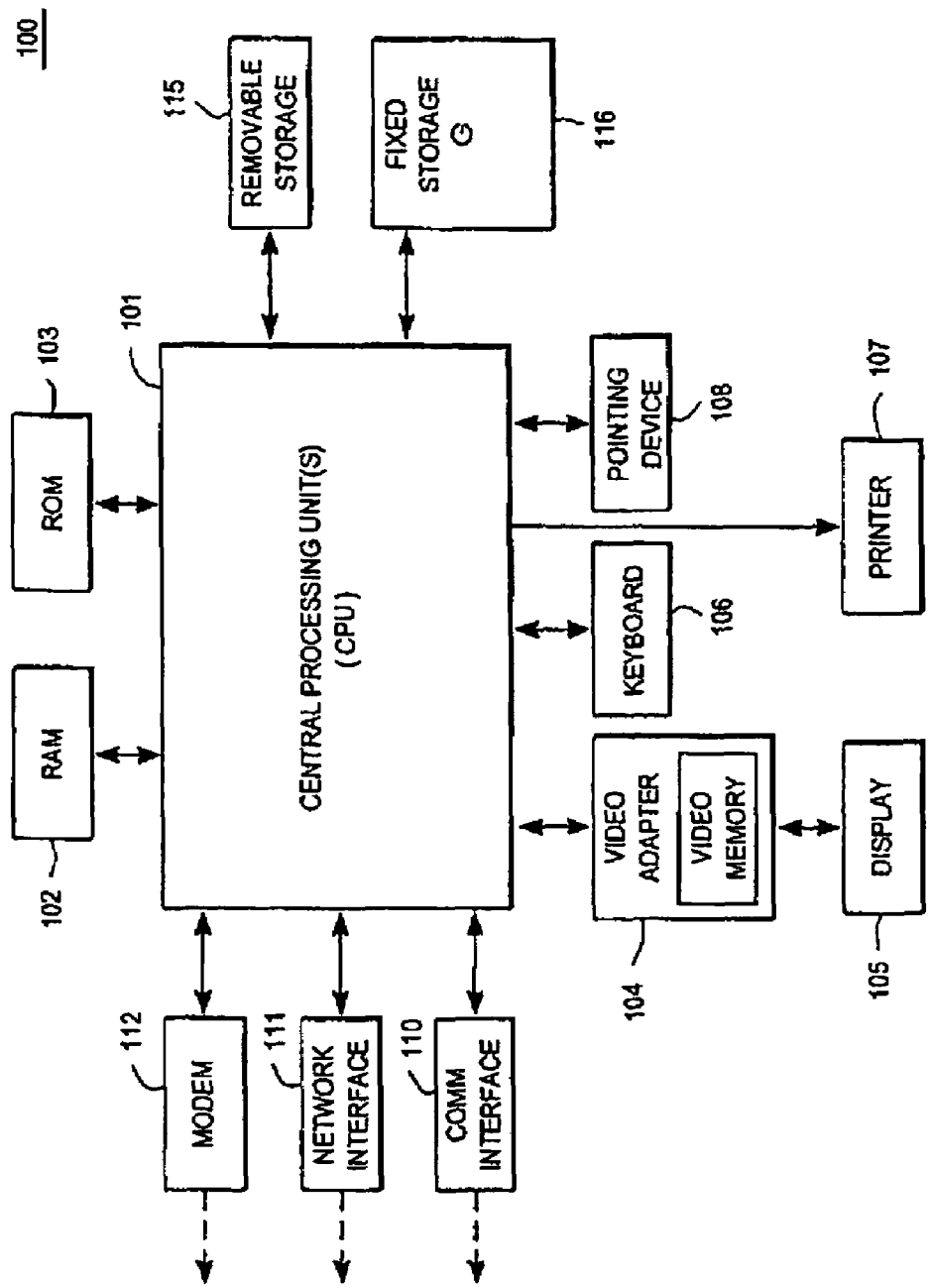
FIG. 1 is a block diagram that depicts a conventional or general-purpose computer system that may be used for implementing an embodiment of the present invention.

FIG. 1 is a general block diagram illustrating an exemplary system in which concepts and methods consistent with the present invention may be implemented. The system includes a personal computer system 100. As shown, system 100 includes a central processor unit(s) CPU 101 coupled to a random-access memory (RAM) 102, a read-only memory (ROM) 103, a keyboard 106, a pointing device 108, a video adapter 104 coupled to a display 105, a removable storage device 115, a fixed storage device 116, a communication port or interface 110, a modem 112, a network interface or controller 111, and a real-time system clock is included with system 100.

CPU 101 communicates with other components of system 100 via a bi-directional system bus. The bus, which includes address lines for addressing system memory, provides data transfer between and among the various components. Random-access memory (RAM) 102 serves as the working memory for CPU 101. Read-only memory (ROM) 103 contains basic input output system code (BIOS)—a set of low-level routines in the ROM 103 that application programs and the operating systems can use to interact with the hardware, including reading characters from the keyboard, outputting characters to printers, and so forth.

Mass storage devices 115 and 116 provide persistent storage on fixed and removable media, such as magnetic, optical or magnetic-optical storage systems, or flash memory, or any other available mass storage technology. The mass storage may be shared on a network or it may be a dedicated mass storage.

System 100 displays text and/or graphic images and other data on display device 105, which is driven by video adapter 104, which is interposed between display 105 and system 100. Video adapter 104 includes video memory accessible to CPU 101, provides circuitry that converts pixel data stored in the video memory to a raster signal suitable for use by a cathode ray tube (CRT) raster or liquid crystal display (LCD) monitor, or any other suitable device. A hard copy of the displayed information or any other information within system 100 may be obtained from printer 107, or any other output device.

The system communicates with other devices via network interface card (NIC) 111 connected to a network and/or modem 112. System 100 may also communicate with local occasionally-connected devices via communication interface 110.

The above-described computer system 100 is discussed for the purpose of illustrating the basic hardware underlying client and server computer components that may be implemented in the method of the present invention.

Figure 2:
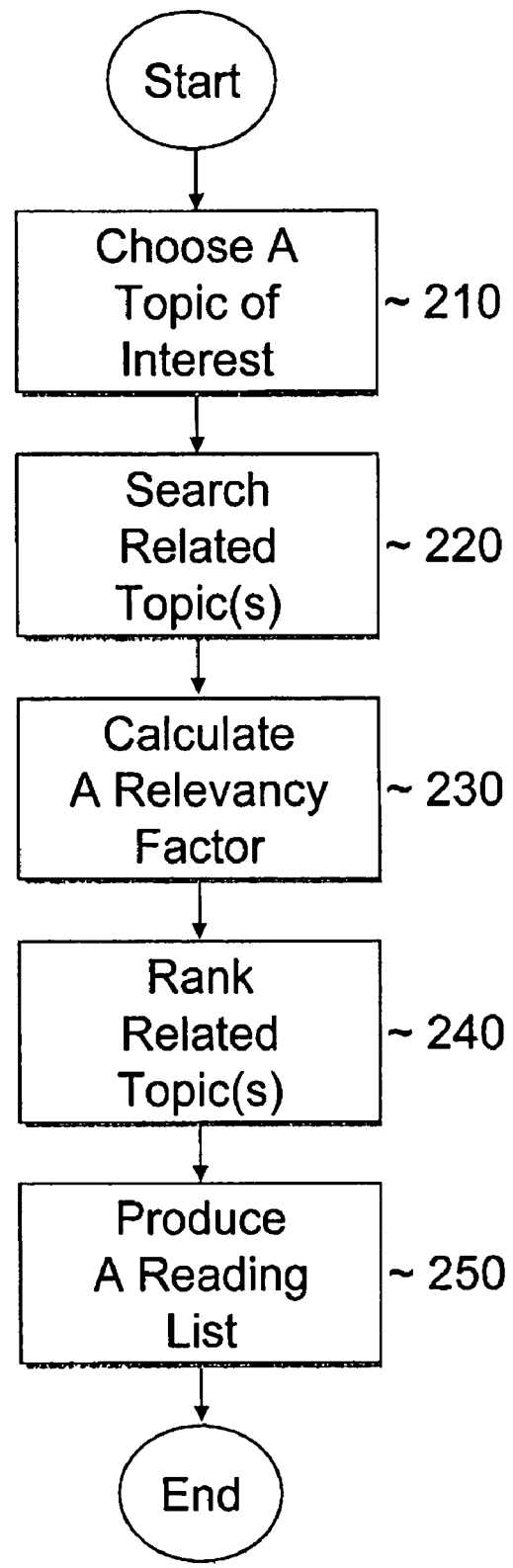
FIG. 2 is a flowchart illustrating a method consistent with the principles of an embodiment of the present invention.

FIG. 2 is a flow chart 200 illustrating methods consistent with principles of an embodiment of the present invention for creating an ordered reading list. A topic of interest is chosen at step 210, which can be done in a variety of ways. One method of choosing a topic of interest is facilitated by a user manually choosing a topic about which he/she wishes to obtain information. The user may enter his/her choice of topic using an interface, such as, but not limited to, a computer or a hand-held device. The user may take a photograph of something that he/she wishes to learn about, which is generally processed to determine a subject of the picture. Another method of choosing a topic of interest would be to scan a barcode on an item of interest. In addition, there are several other methods of determining a topic of interest such as determining an item of interest based on user history or pattern recognition.

Figure 8A:
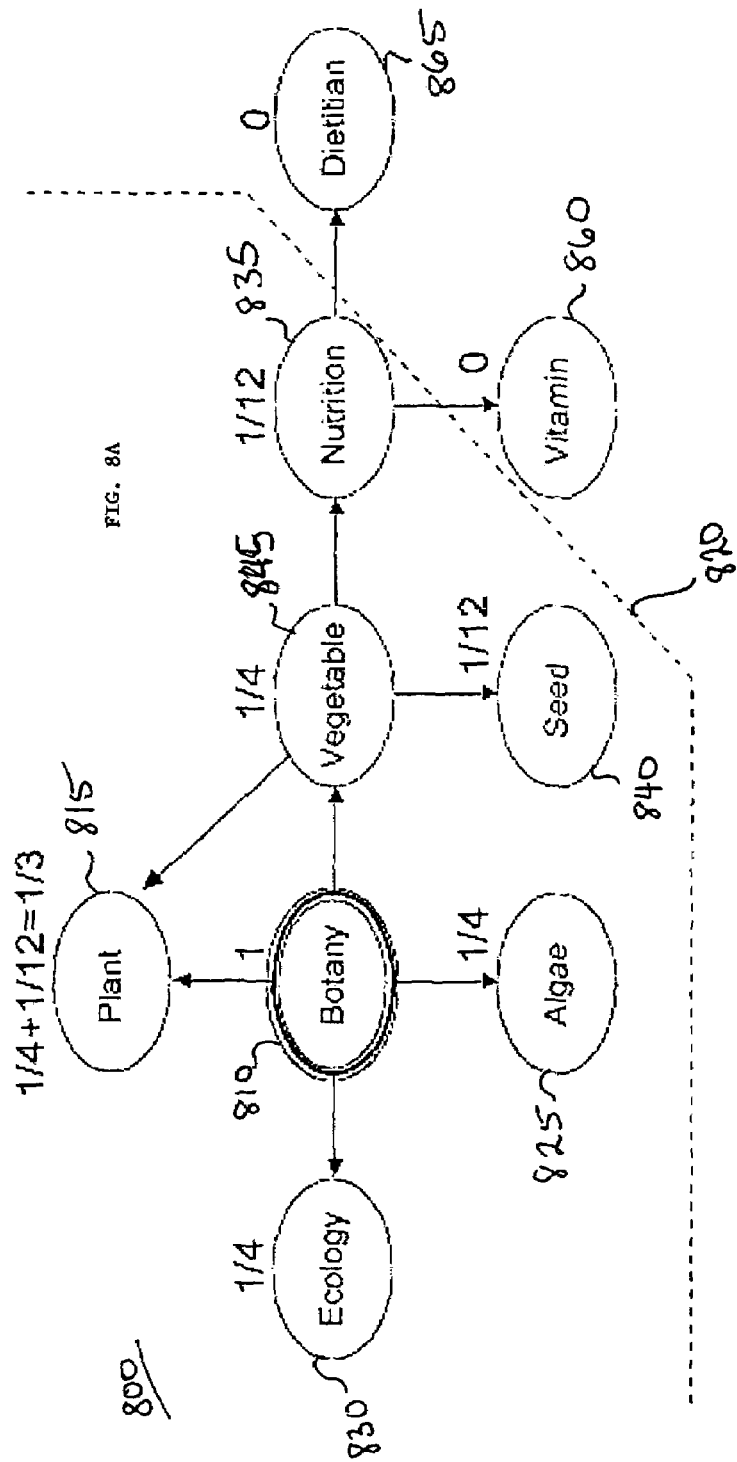
FIG. 8A is a chart illustrating the propagation of topic weights outward from a seed with summed weights due to link voting shown.

At step 220, a search is conducted for topics that are related to the topic of interest. For example, if the topic of interest is 'Botany', as shown in FIG. 8A, the related topics may be 'Plant', 'Ecology', 'Algae', and 'Vegetable'. At step 230, a calculation determines a relevancy factor. The relevancy factor is designed to rank the relevancy of each related topic found in step 220. For example, if 10 topics were found to be related to one another, it is most likely that they are not equally related to the topic of interest. Generally, few topics are extremely related, while others are not very related at all. At step 240, the ranks determined in the calculation step 230 are ranked in order, thereby producing a reading list with ranked related topics of interest, at step 250.

Figure 3:
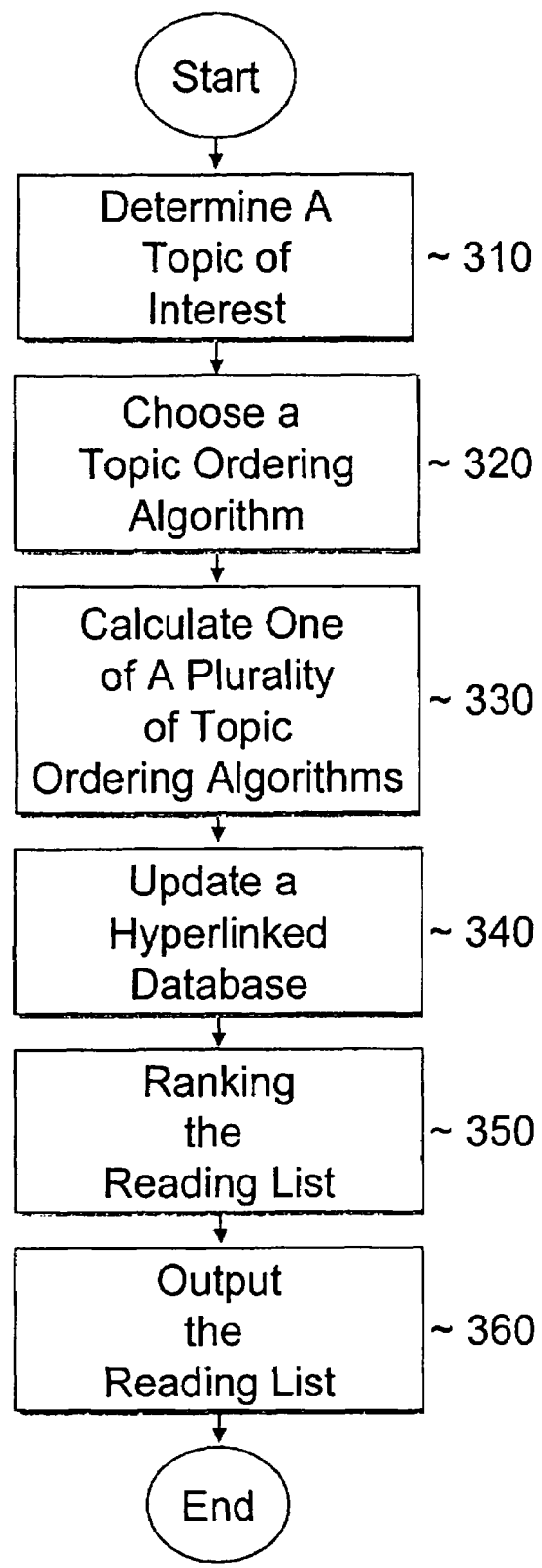
FIG. 3 is a flowchart illustrating a method consistent with principles of another embodiment of the present invention.
Figure 8B:
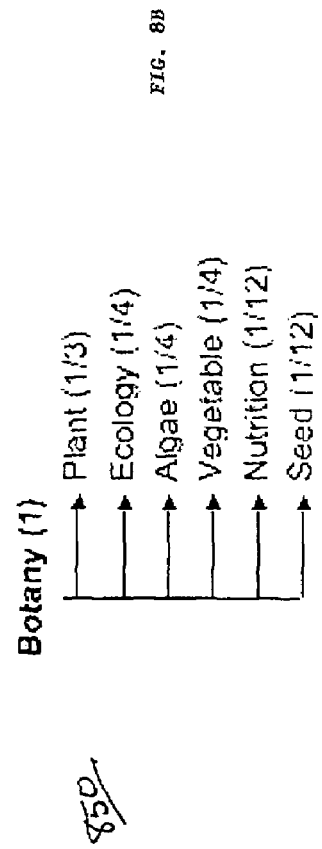
FIG. 8B is an example of a reading list according to an embodiment of the present invention.

FIG. 3 is a flow chart 300 illustrating methods consistent with principles of another embodiment of the present invention for creating an ordered reading list. At step 310, at least one topic of interest is determined. A topic ordering algorithm is chosen from a plurality of topic ordering algorithms at step 320. The algorithms include but are not limited to a top-down schematic algorithm, a bottom-up schematic algorithm, and a horizontal schematic algorithm. Basically, the algorithm produces an outcome based on the individual schematic of each. A description of each type of schematic is discussed below in further detail. At step 330, a calculation takes place, where one of a plurality of topic ordering algorithms is calculated. The algorithm may be chosen, but is not limited to such reason, based on the topic of interest and the user's preferences. The area where information can be found to relate to a topic of interest is in a hyperlinked database which is updated in a number of ways, at step 340. The hyperlinked database may be updated automatically, periodically, continuously, or in other temporal fashions. At step 350, a reading list is formed and each entry in the reading list is ranked based on its relevancy to the topic of interest, as seen in FIG. 8B. This is determined using the topic ordering algorithm. At step 360, the ranked reading list is output to an interface. The interface may be an iPod, a computer, an MP3 player, a telephone, or the like.

The top-down schematic most resembles a traditional search technique. Basically, using the top-down schematic entails generating a fixed-length ordered list of relevant pages from a hypertext for background reading based on a set of "seed topics" inputted by the user. A seed topic essentially is a central intellectual theme of a top-down reading list, to which all of the items in the reading list must relate. It may also be viewed as a root of a graph tree out from which topics are selected for the list. The user supplies a query string which is then parsed and partitioned into the longest possible word subsequences that match titles in the hypertext, which directly correspond to the seed topics. For example, "Queen Elizabeth II London tower" would be parsed and partitioned into the seed topics "Queen Elizabeth II" and "London tower," which are the nodes in the hypertext out from which weights are propagated.

To accomplish this scenario, directed links are produced and are to be followed outwards from the seed topics and articles with depreciating value according to the amount of outbound links in existence.

The top-down schematic implements a localized node weighting algorithm with biases that may be tuned to place a set of articles in an order. A general calculation of the weighting algorithm is performed by iterating the equation until convergence. An illustrative weighting algorithm is $v=\alpha*A*v+(1-\alpha)*[(\beta e_{pers}+(1-\beta)*\Sigma(e_i/N)]$, where v is a vector whose coordinates are the article rank values, and A is the Markov matrix of the link graph of an online source of information, Wikipedia, for example. Also, $e_{pers}$ is the personalization unit vector whose coordinates have a uniform nonzero value if they correspond to seed topics and are zero otherwise. In addition, $e_i$ is the unit vector along article i, $\alpha=d/(1+d)$ parameterizes mean reachable article a distance d from the seed articles (assuming no back-links), and $\beta$ parameterizes the degree of personalization.

In one embodiment of the weighting algorithm, $\beta=0$. Although, $\beta<1$ may allow useful database-wide influence on the topic listing, highly linked and often irrelevant attractor articles tended to be promoted in practice and so $\beta=1$ is used also. FIG. 4 is a table illustrating an influence of personalization tuning parameter $\beta$, on top-down ordering for "Helicopter," for example, with d=0.1. The topics covered by a maximum personalization level are underlined in FIG. 4.

Another parameter, $\alpha$, may vary according to a desired list size and breadth. For $\alpha<<1$, the ordering is determined primarily by the shortest path lengths from the seed articles. Increasing a increases the symmetry-breaking influence of inbound links. The mean log out degree of the online source of information, Wikipedia for example, is approximately (In b)=1.17±1.32. Accordingly, the average logarithm of the number of articles that each article in the online source as of a specific date was, for example, approximately 1.17. This figure may be useful in deciding how far to propagate the weights. Therefore, for preparing a list of 10 articles, where N=10, a mean depth of $d=\log_b[N(b-1)+1]-\approx 1.69$ corresponding to $\alpha\approx 0.63$ is used.

The hyperlinked database used in the present invention may be formed using an online source of information as its foundation for the hyperlinked database. This hyperlinked database may be continuously or periodically updated, without any human intervention. Although humans may edit and update the text of the online source of information, the resulting links between any articles may be extracted automatically and periodically, without human intervention.

In one example, a snapshot of the English Wikipedia articles without images may be used as a hyperlinked database corpus. Link structure may be extracted using a regular expression matching from the raw structured query language ("SQL") file. Iterations may be halted after approximately 15N steps, where $N\approx 1.4\times 10^6$ is the number of articles, after the observation that 15 iterations are generally needed for a localized node weighting convergence. This process is completed in just a few minutes. Other articles, such as author pages, may be discarded prior to making a ranking.

Figure 5:
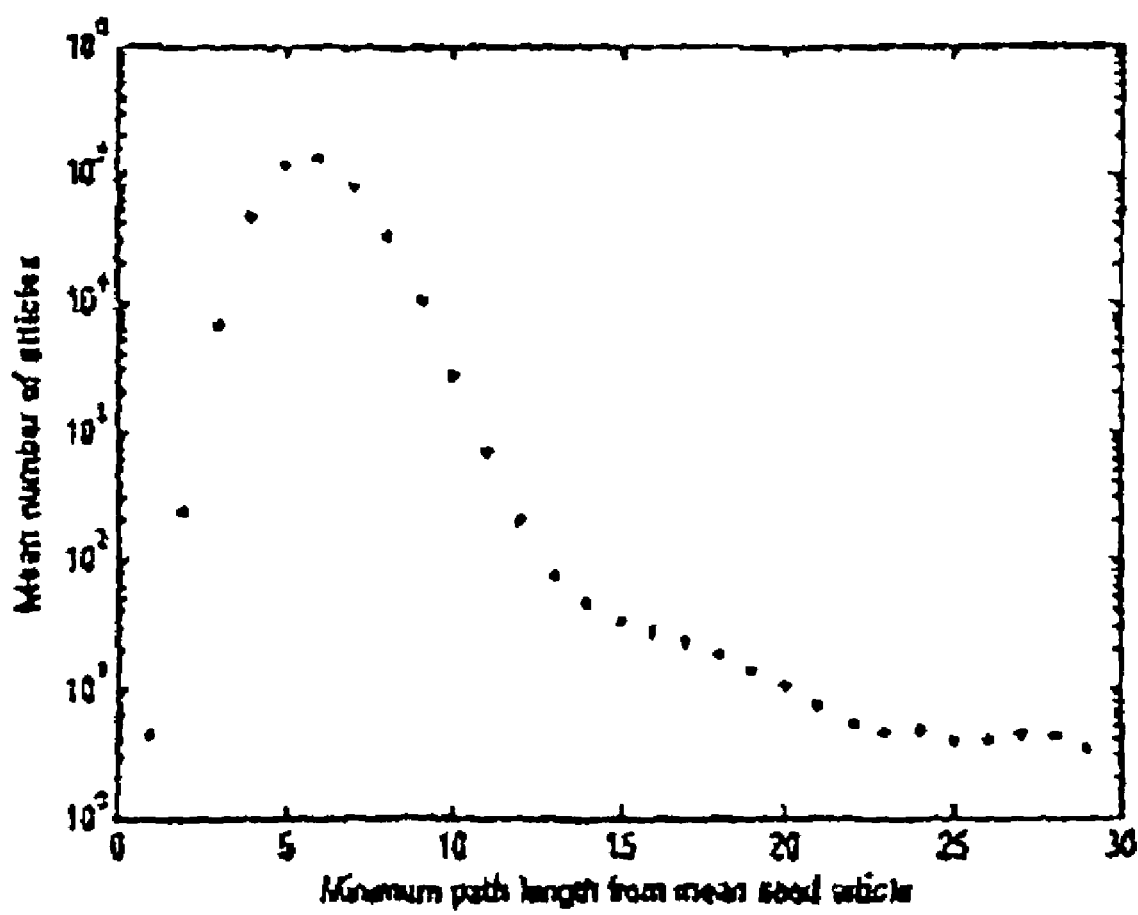
FIG. 5 is a graph depicting an average number of articles at different minimum path lengths from a seed article, with a sample size of 100.

The top-down scenarios discussed above arise when an ordering that favors minimum path length from seed topics primarily and link voting secondarily a quasi-breadth first ordering out from selected seed topics is desired. Although seed topics of differing weights could be accommodated, other scenarios may require further processing of the ranks. Turning now to FIG. 5, for distances below 6 links, for example, the calculated rank of articles will decrease approximately exponentially with distance from a seed article due to a relatively constant branching factor. Because each topic links to an average number 'N' of other topics, the number of topics that are link distance k away from a topic is approximately $N^k$ when k is small, but not limited to, k being less than 6. Therefore, in a bottom-up scenario, to linearly parameterize the ordering from source topics (e.g., physics) to sink topics (e.g., helicopter) of an article k, the ratio is, $$\prod_i v_{source(i)\to k} \Big/ \prod_j v_{source(j)\to k},$$

of a source rank to a sink rank are calculated. As a relevance cutoff, the product, $$\prod_i v_{source(i)\to k} * \prod_j v_{sink(j)\to k},$$

of the source and sink ranks is applied to achieve the desired list size. This approach generalizes trivially to multiple sources and sinks. The source rank is the weight due to weight propagation out from a source topic. The sink rank is the weight due to weight propagation out from a sink topic.

FIG. 6 is a table that shows a comparison of methods for a bottom-up ordering of the example (from Physics to Helicopter). The minimum path lengths are indicated for the distance ordering. Distances are graphed to make a comparison from seed topics which are calculated and ordered by the difference of distances, $$\sum_{ij} [|d_{source(i)\to k} - d_{sink(j)\to k}|].$$

and cut off by a sum of the distances, $$\sum_i d_{source(i)\to k} + \sum_j d_{sink(j)\to k},$$

as demonstrated in FIG. 6.

Using an optional function, like multiplication, on weights calculated from individual seed topics to combine the weights and then select nodes in the hypertext that are relevant to and lie at the interface of the plurality of seed topics. For example, the query "geology and botany" may generate a list of topics at their interface including "soil, sedimentation, erosion, terraforming, astrobiology, coral, extremophile algae," as an example of a horizontal scenario.

For short lists, distance ordering is found to be more robust against including less relevant, highly linked topics. Distance based ordering is an ordering of topic nodes based entirely on the minimum length of a path, following directed links in the link structure, from a seed topic to a plurality of other topics. For both the merged Page Rank and the distance ordering, the lists are unbalanced between the seed topics due to different numbers of closed loop self-references and different seed topic out-degrees, respectively.

For the horizontal scenario, orderings are parameterized by absolute differences of logs of ranks. For example, $$\sum_{ij} (|\log v_{seed(i) \to k} - \log v_{seed(j) \to k}|),$$

and an absolute difference of a distance is calculated by $$\sum_{ij} (|d_{seed(i) \to k} - d_{seed(j) \to k}|),$$

with analogous cutoff methods. In the horizontal scenario, where long curricula may be desirable, distance-based ordering is at a disadvantage because large numbers of similar and unrelated articles may lie at identical distances from the seed topics.

FIG. 7 shows an example of seed topics where a set of countries is equidistant from the topics in the table of FIG. 7. While an application of a page rank based ordering promotes unrelated attractor articles, distance based ordering yields articles in short lists with a higher level of relevancy, as seen in FIG. 7. Essentially, the distance-based ordering produces a more accurate and "smarter" result than the application of a modified rank.

To further explain the horizontal scenario, the Physics and the Helicopter topics will be used as examples. This entails an optional combining function on weights calculated from individual seed topics to combine weights. An ordered list of nodes is selected that is relevant for linearly connecting one seed topic to another. For example, the query "physics→helicopter" would automatically generate a curriculum leading from the first topic, physics, to the second topic, helicopter. In one example, the chain of topics would read: "physics→classical mechanics→fluid mechanics→aerodynamics→aeronautical engineering→helicopter".

Generally, the top-down scenario and the horizontal scenario are catered to download to a personal computer, or any computing device. The bottom-up scenario is generally catered to but is not limited to, downloading to a mobile interface, like an iPod, an MP3 player, or a mobile telephone. Notably, mass storage capacities for many wearable devices, such as the iPod and a hard drive-based mobile telephone, have exceeded the database for the regular online sources of information websites. Therefore, mobile generation and presentation of algorithmically generated curricula is now possible.

FIG. 8A is a chart 800 illustrating a propagation of a topic weight outward from a seed with summed weights due to a link voting, as shown. For exemplary purposes, in FIG. 8A, the seed topic 810 is 'Botany'. In this example, no topics beyond a graph distance of 3 edges, depicted with a dotted line 820 from the seed topic 810 are included in a reading list 850, as shown below, in FIG. 8B.

As shown in FIG. 8A, seed topic 810 is assigned a value of 1. Using the above-mentioned algorithms and processes, four topics that spur from seed topic 810, including Plant 815, Vegetable 845, Algae 825, and Ecology 830 each are assigned a value of ¼. Topic Vegetable 845 divided into 3 topics, Plant 815, Nutrition 835, and Seed 840, therefore those three topics are assigned a value of ¹⁄₁₂, which is essentially the value of Vegetable 845, which is ¼, divided by 3, which equals ¹⁄₁₂.

Because Plant 815 is related to two different topics, Botany 810 and Vegetable 845, the two values are added to give Plant 815 a value of ¼+¹⁄₁₂, which equals ⅓.

Now, referring to FIG. 8B, an example of a reading list 850 is shown. Because Plant 815 has the highest value (rank), Plant 815 is listed first. The 3 with a ¼ rank are then listed, including Ecology 830, Algae 825, and Vegetable 845. Following the topics with a ¼ rank are those with the ¹⁄₁₂ rank including Nutrition 835 and Seed 840. Reading list 850 is cutoff at this point based on a relevancy of remaining topics. Therefore, topics Vitamin 860 and Dietitian 865 are not shown in reading list 850. Each of these topics are hyperlinked, so when the user clicks on any of those topics, the user will be automatically led to information about that specific topic.

Although the illustrative embodiment described herein refers to an instrument for a readable body, the present invention may also implement other content, such as audio data and video data.

Although the illustrative embodiment described herein is described to process and function with and using the English language, the present invention may be implemented to process and function with different languages and different character sets, including encrypted data. The present invention may be implemented to use different languages and different character sets as well.

Although illustrative algorithms have been described and disclosed herein, the methods of the present invention may be implemented to function with other algorithms to produce an outcome.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for creating an ordered reading list of predetermined length of relevant topics from a hyperlinked database source of information website based on a user's input, the method comprising:
   determining at least one topic of interest;
   choosing a topic ordering algorithm from a plurality of topic ordering algorithms including a top-down schematic algorithm, a bottom-up schematic algorithm, and a horizontal schematic algorithm, said top-down schematic algorithm comprises a page rank calculation performed by iterating until a convergence, said bottom-up schematic algorithm comprises a ratio of a combined weight from a plurality of source topics to a plurality of sink topics of an article, said bottom-up schematic algorithm linearly parameterizes an ordering from said source topics to said sink topics of an article k, wherein a ratio is $\Pi_i v_{source(i) \_k} / \Pi_j v_{source(j) \_k}$ of a rank of said source topics to a rank of said sink topics, wherein a point where relevance of said topics is cutoff is calculated by multiplying $\Pi_i v_{source(i) \_k}$ by $\Pi_j v_{sink(j) \_k}$, wherein a comparison is found by graphing a distance from said seed topics, ordered by a difference of distances, calculated by $[\Sigma_{ij} |(d_{source(i) \_k}) - (d_{sink(j) \_k})|]$, and is cutoff by a sum of distances calculated by $\Sigma_i d_{source(i) \_k} + \Sigma_j d_{sink(j) \_k}$, and said horizontal schematic algorithm comprises an order parameterization by absolute differences of a log of a plurality of ranks and an absolute difference of a plurality of distances with analogous cutoff methods, wherein said sink topic is where said reading list terminates and said source topic is where said reading list begins; calculating one of a plurality of topics ordering algorithms based on said topic of interest and a user;

updating said hyperlinked database source of information;

forming a reading list and ranking said reading list based on said topic ordering algorithm; and outputting said ranking and said reading list to an interface depending on an outcome of said topic ordering algorithm.

2. The method of claim 1 further comprising downloading said ranking and said reading list to a hand-held device.

3. The method of claim 1 further comprising downloading said ranking and said reading list to a portable music device.

4. The method of claim 1 further comprising outputting a web-based link to correspond with each item on said reading list.

5. The method of claim 1 further comprising inputting said topic of interest.

6. The method of claim 1 further comprising refining a search using a web-based link corresponding to a topic in a previously generated said reading list.

7. The method of claim 1 further comprising determining said topic of interest by reviewing a text output of a visual search engine, a barcode recognition engine, or an optical character recognition engine.

8. The method of claim 1 wherein said horizontal schematic algorithm includes an ordering parameterized by an absolute difference of a log of a plurality of ranks calculated by $\Sigma_{ij}(|\log v_{seed(i)\_k} - \log v_{seed(j)\_k}|)$, and an absolute difference of a distance calculated by $[\Sigma_{ij}(|d_{seed(i)\_k} - d_{seed(j)\_k}|)]$.

9. The method of claim 1 wherein said hyperlinked database may be updated continuously.

10. The method of claim 1 wherein said hyperlinked database may be updated at preset intervals of time.

11. The method of claim 1 wherein said hyperlinked database source of information is Wikipedia online encyclopedia.

12. The method of claim 1 wherein said hyperlinked database source of information is updated without human intervention.

13. A method for creating an organized reading list of a predetermined length of relevant topics from a hyperlinked database source of information website for a user, the method comprising:

determining a topic of interest based on a plurality of methods;

choosing a topic ordering algorithm from a plurality of topic ordering algorithms including a top-down schematic algorithm, a bottom-up schematic algorithm, and a horizontal schematic algorithm, said top-down schematic algorithm comprises a page rank calculation performed by iterating until a convergence, said bottom-up schematic algorithm comprises a linear parameterization of a ratio of an order from a plurality of source topics to a plurality of sink topics of an article, and said horizontal schematic algorithm comprises an order parameterization by absolute differences of a log of a plurality of ranks and an absolute difference of a plurality of distances with analogous cutoff methods;

calculating one of a plurality of topic ordering algorithms based on said topic interest and a user;

updating a database of information continuously;

ranking said list of reading materials based on said topic ordering algorithm wherein said top-down schematic algorithm is $v=\alpha Av+(1-\alpha)*[(\beta e_{pers}+(1-\beta)*\Sigma(e_i/N)]$, wherein v is a vector with a first set of coordinates corresponding to a rank value of an article, A is a Markov matrix of a link graph of said online source of information, $e_{pers}$ is a personalization unit vector with a second set of coordinates that have a uniform nonzero value if said second set of coordinates correspond to a seed topic and have a zero if said second set of coordinates do not correspond to a seed topic, $e_i$ is a unit vector along article i, $\alpha=d/(1+d)$ parameterizes mean reachable article a distance d from said seed articles, and $\beta$ parameterizes a degree of personalization, said bottom-up schematic algorithm linearly parameterizes an ordering from said source topics to said sink topics of an article k, wherein a ratio is $\Pi_i v_{source(i)\_k}/\Pi_j v_{source(j)\_k}$ of a rank of said source topics to a rank of said sink topics, wherein a point where relevance of said topics is cutoff is calculated by multiplying $\Pi_i v_{source(i)\_k}$ by $\Pi_j v_{source(j)\_k}$, wherein a comparison is found by graphing a distance from said seed topics, ordered by a difference of distances, calculated by $[\Sigma_{ij}|(d_{source(i)\_k}) - (d_{sink(j)\_k})|]$, and is cutoff by a sum of distances calculated by $\Sigma_i d_{source(i)\_k} + \Sigma_j d_{sink(j)\_k}$ and wherein said horizontal schematic algorithm, an ordering is parameterized by an absolute difference of a log of a plurality of ranks calculated by $[\Sigma_{ij}(|\log v_{seed(i)\_k} - \log v_{seed(j)\_k}|]$, and an absolute difference of a distance is calculated by $[\Sigma_{ij}(|d_{seed(i)\_k} - d_{seed(j)\_k}|)]$;

ranking said list of reading materials based on said topic ordering algorithm;

attaching a web-based link with each reading material in said list of reading materials; and uploading said ranking and said list of reading materials to an interface.

14. The method of claim 13 further comprising downloading said ranking and said list of reading materials to a portable hand-held device.

15. A method for creating an ordered reading list of predetermined length of relevant topics from a hyperlinked database source of information website based on a user's input, the method comprising:

determining at least one topic of interest;

choosing a topic ordering algorithm from a plurality of topic ordering algorithms including a top-down schematic algorithm, a bottom-up schematic algorithm, and a horizontal schematic algorithm, said top-down schematic algorithm comprises a page rank calculation performed by iterating until a convergence, wherein said top-down schematic algorithm is $v=\alpha Av+(1-\alpha)*[(\beta e_{pers}+(1-\beta)*\Sigma(e_i/N)]$, wherein v is a vector with a first set of coordinates corresponding to a rank value of an article, A is a Markov matrix of a link graph of said online source of information, $e_{pers}$ is a personalization unit vector with a second set of coordinates that have a uniform nonzero value if said second set of coordinates correspond to a seed topic and have a zero if said second set of coordinates do not correspond to a seed topic, $e_i$ is a unit vector along article i, $\alpha=d/(1+d)$ parameterizes mean reachable article a distance d from said seed articles, and $\beta$ parameterizes a degree of personalization, said bottom-up schematic algorithm comprises a ratio of a combined weight from a plurality of source topics to a plurality of sink topics of an article, and said horizontal schematic algorithm comprises an order parameterization by absolute differences of a log of a plurality of ranks and an absolute difference of a plurality of distances with analogous cutoff methods, wherein said sink topic is where said reading list terminates and said source topic is where said reading list begins; calculating one of a plurality of topics ordering algorithms based on said topic of interest and a user;
updating said hyperlinked database source of information;
forming a reading list and ranking said reading list based on said topic ordering algorithm; and
outputting said ranking and said reading list to an interface depending on an outcome of said topic ordering algorithm.

16. The method of claim 15 further comprising outputting a web-based link to correspond with each item on said reading list.

17. The method of claim 15 further comprising inputting said topic of interest.

18. The method of claim 15 wherein said hyperlinked database may be updated continuously.

19. The method of claim 15 wherein said hyperlinked database source of information is updated without human intervention.

20. A method for creating an ordered reading list of predetermined length of relevant topics from a hyperlinked database source of information website based on a user's input, the method comprising:
determining at least one topic of interest;
choosing a topic ordering algorithm from a plurality of topic ordering algorithms including a top-down schematic algorithm, a bottom-up schematic algorithm, and a horizontal schematic algorithm, said top-down schematic algorithm comprises a page rank calculation performed by iterating until a convergence, said bottom-up schematic algorithm comprises a ratio of a combined weight from a plurality of source topics to a plurality of sink topics of an article, and said horizontal schematic algorithm comprises an order parameterization by absolute differences of a log of a plurality of ranks and an absolute difference of a plurality of distances with analogous cutoff methods, wherein said sink topic is where said reading list terminates and said source topic is where said reading list begins, and wherein said horizontal schematic algorithm includes an ordering parameterized by an absolute difference of a log of a plurality of ranks calculated by $\Sigma_{ij}(|\log v_{seed(i)\_k} - \log v_{seed(j)\_k}|)$, and an absolute difference of a distance calculated by $[\Sigma_{ij}(|d_{seed(i)\_k} - d_{seed(j)\_k}|)]$;
calculating one of a plurality of topics ordering algorithms based on said topic of interest and a user;
updating said hyperlinked database source of information;
forming a reading list and ranking said reading list based on said topic ordering algorithm; and
outputting said ranking and said reading list to an interface depending on an outcome of said topic ordering algorithm.

21. The method of claim 20 further comprising outputting a web-based link to correspond with each item on said reading list.

22. The method of claim 20 further comprising inputting said topic of interest.

23. The method of claim 20 wherein said hyperlinked database may be updated continuously.

24. The method of claim 20 wherein said hyperlinked database source of information is updated without human intervention.

* * * * *